US008867533B2

(12) United States Patent
Machnicki

(10) Patent No.: US 8,867,533 B2
(45) Date of Patent: Oct. 21, 2014

(54) MULTI-TIER SWITCH INTERFACE UNIT ARBITER

(71) Applicant: Apple Inc., Cupertino, CA (US)

(72) Inventor: Erik P. Machnicki, San Jose, CA (US)

(73) Assignee: Apple Inc., Cupertino, CA (US)

( * ) Notice: Subject to any disclaimer, the term of this patent is extended or adjusted under 35 U.S.C. 154(b) by 107 days.

(21) Appl. No.: 13/736,462

(22) Filed: Jan. 8, 2013

(65) Prior Publication Data

US 2014/0192801 A1   Jul. 10, 2014

(51) Int. Cl.
*H04L 12/66* (2006.01)
*H04L 12/50* (2006.01)
*H04J 3/02* (2006.01)
*G06F 15/173* (2006.01)
*H04L 12/933* (2013.01)

(52) U.S. Cl.
CPC ..................................... *H04L 49/15* (2013.01)
USPC ........... 370/355; 370/388; 370/461; 370/537; 709/238

(58) Field of Classification Search
CPC ......... H04L 49/00; H04L 49/10; H04L 49/25; H04L 49/35; H04L 49/101; H04L 49/153; H04L 49/356; H04L 49/602; H04L 49/1507; H04L 49/1515; H04L 49/1523; H04L 2012/5681; G06F 13/4022; G06F 3/067
USPC .................. 709/201–203, 213–216, 230–244
See application file for complete search history.

(56) References Cited

U.S. PATENT DOCUMENTS

| 6,671,275 | B1 * | 12/2003 | Wong et al. .................... 370/389 |
| 6,954,424 | B2 | 10/2005 | Barrack et al. |
| 7,007,123 | B2 * | 2/2006 | Golla et al. .................... 710/243 |
| 7,079,525 | B1 * | 7/2006 | Goldstein et al. ............. 370/352 |
| 7,471,691 | B2 * | 12/2008 | Black et al. .................... 370/403 |
| 7,596,647 | B1 | 9/2009 | Van Dyke et al. |
| 7,710,996 | B1 * | 5/2010 | Damaraju et al. ............. 370/461 |
| 7,742,486 | B2 | 6/2010 | Nielsen et al. |
| 8,412,870 | B2 * | 4/2013 | Fredenberg et al. .......... 710/119 |
| 8,732,370 | B2 * | 5/2014 | Chirca et al. .................. 710/243 |
| 2012/0072631 | A1 | 3/2012 | Chirca et al. |

* cited by examiner

*Primary Examiner* — Tri H Phan
(74) *Attorney, Agent, or Firm* — Rory D. Rankin; Meyertons, Hood, Kivlin, Kowert & Goetzel, P.C.

(57) ABSTRACT

Systems and methods for arbitrating among traffic from a coherence point to a switch fabric. A multi-level arbiter is used to avoid starvation while providing fairness and high bandwidth on the connection path between the coherence point and the switch fabric. A first level of arbitration selects packets with enough available credits for forwarding from the switch fabric on a downstream channel. The second level of arbitration arbitrates among short packets at a first arbiter and arbitrates among long packets at a second arbiter. The selected short packet and the selected long packet are forwarded to a third level of arbitration. The third level of arbitration alternates between long and short packets and forwards the selected packet to the switch fabric.

26 Claims, 8 Drawing Sheets

MULTI-TIER SWITCH INTERFACE UNIT ARBITER

BACKGROUND

1. Field of the Invention

The present invention relates generally to the field of computer systems, and in particular to methods and mechanisms for arbitrating among transactions in a bus fabric.

2. Description of the Related Art

A system on chip (SoC) often includes multiple input/output (I/O) devices and a processor sharing one or more memory devices via a memory controller. Many different agents may generate memory transactions and convey these memory transactions to the memory controller. Often, a coherence point and a switch fabric may be used to maintain the ordering and coherence of memory and input/output (I/O) transactions within the SoC and for routing the transactions to the proper locations.

Typically, the coherence point manages many transactions from multiple sources targeting a variety of agents. For example, one of the roles of the coherence point is to determine which transaction out of many transactions to send on a system bus to the switch fabric. In this role, the coherence point is tasked with avoiding starvation of traffic while providing fairness and efficiently using the available bandwidth on the connection path to the switch fabric.

SUMMARY

Systems and methods for arbitrating among transactions within a coherence point are contemplated.

A system on chip (SoC) may include a processor complex, a memory controller, a coherence point, a switch fabric, and multiple input/output (I/O) devices. The coherence point may be configured to process transactions generated by multiple different agents. The transactions may include requests and responses targeting any number of destinations. In one embodiment, the coherence point may be coupled to the memory controller for upstream traffic and the coherence point may be coupled to the switch fabric for downstream traffic. In one embodiment, there may be a single connection path between the coherence point and the switch fabric. In the downstream direction from the switch fabric, the switch fabric may include multiple legs for connecting to multiple agents in the SoC. Each agent connected to a leg of the switch fabric may have its own set of credits for allowing traffic to be sent on that leg.

In one embodiment, the coherence point may include a switch interface unit (SIU) for arbitrating among traffic going to the switch fabric. The SIU may use a multi-tiered arbiter for determining which requests to forward from the coherence point to the switch fabric. The multi-tiered arbiter may be configured to avoid starvation of transactions while providing fairness and high bandwidth on the connection path from the coherence point to the switch fabric.

The first tier of the multi-tiered arbiter may be configured to select from packets from the same agent that share the same credits. Each agent may have its own arbiter for the first tier, such that packets sharing credits and targeting a given agent may be arbitrated first against other transactions sharing the same credits. In one embodiment, each set of requests sharing credits may be arbitrated against each other, and each set of responses sharing credits may be arbitrated against each other. The individual arbiters of the first tier may only forward a packet to the second tier if there are enough credits for the packet.

Then, after the first tier of the SIU arbiter, the second tier of the SIU arbiter may have separate arbiters for long packets and short packets. A first arbiter in the second tier may arbitrate and select from all of the long packets that were winners out of the first tier arbiters. A second arbiter in the second tier may arbitrate and select from all of the short packets that were winners out of the first tier. In one embodiment, the first and second arbiters in the second tier may use a round robin scheme for arbitrating among packets. Then, the third tier of the SIU arbiter may alternate selecting from long and short packets. If a long packet is selected in a given clock cycle, the third tier arbiter may select a short packet on the next clock cycle to overlap the short packet with the second data beat of the long packet.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
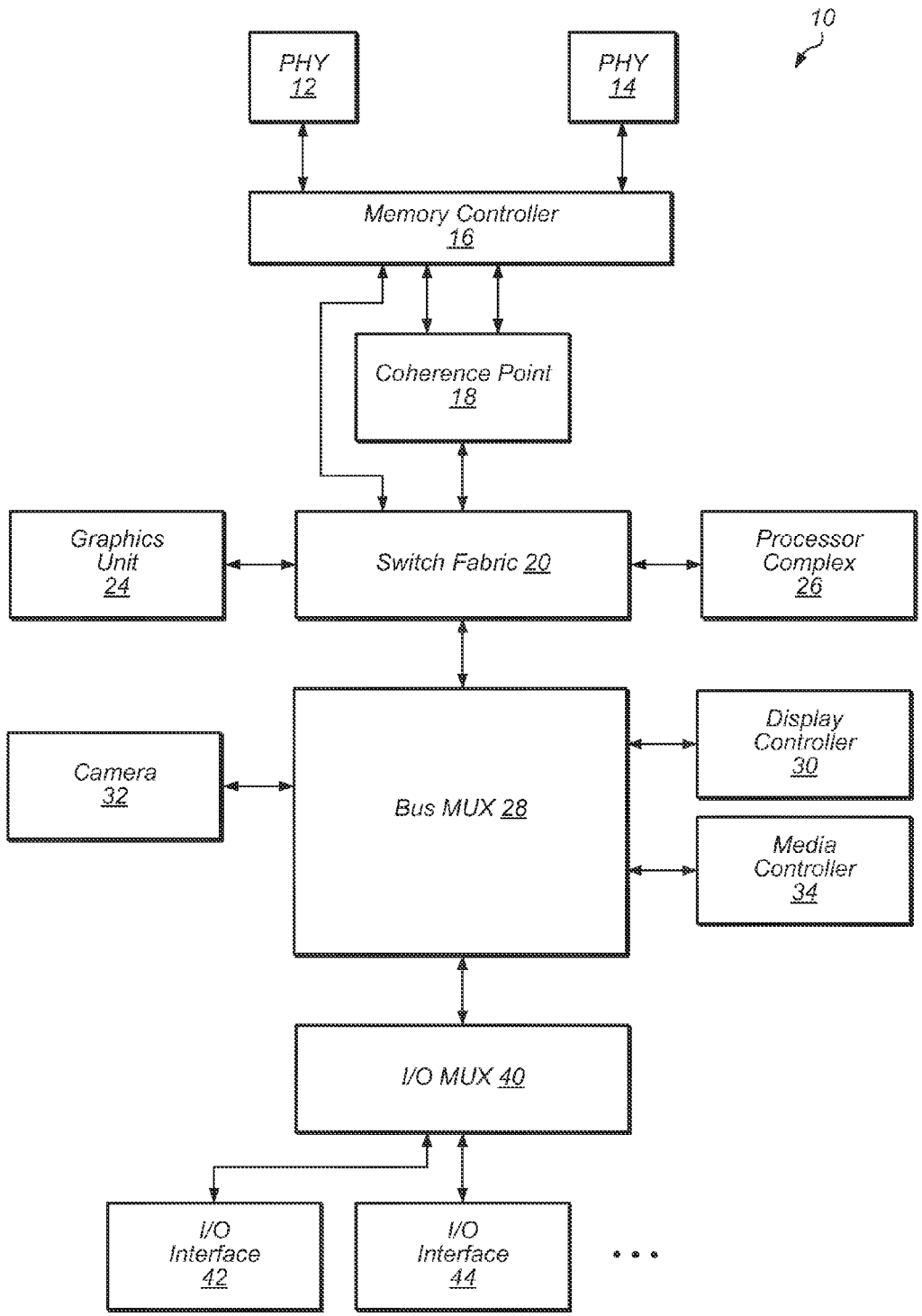
FIG. 1 is a block diagram that illustrates one embodiment of a portion of an IC.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising a switch interface unit . . . ." Such a claim does not foreclose the apparatus from including additional components (e.g., a processor complex, a memory controller, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a memory controller having five ports, the terms "first" and "second" ports can be used to refer to any two of the five ports.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an integrated circuit (IC) is shown. In the illustrated embodiment, IC 10 includes processor complex 26, coherence point 18, switch fabric 20, graphics unit 24, bus mux 28, display controller 30, media controller 34, camera 32, input/output (I/O) mux 40, I/O interfaces 42 and 44, memory controller 16, and memory physical interface circuits (PHYs) 12 and 14. It is noted that IC 10 may also include many other components not shown in FIG. 1 and/or omit one or more of the components shown. In various embodiments, IC 10 may also be referred to as a system on chip (SoC), an application specific integrated circuit (ASIC), or an apparatus. Clock sources, such as phase lock loops (PLLs), and power sources are not shown for ease of illustration.

Components shown within IC 10 may be coupled to each other using any suitable bus and/or interface mechanism. In some embodiments, these components may be connected using ARM Holdings' Advanced Microcontroller Bus Architecture (AMBA®) protocol or any other suitable on-chip interconnect specification for the connection and management of logic blocks. Examples of AMBA® buses and/or interfaces may include Advanced eXtensible Interface (AXI), Advanced High-performance Bus (AHB), Advanced System Bus (ASB), Advanced Peripheral Bus (APB), Advanced Trace Bus (ATB), etc. Other types of bus and interface mechanisms, such as specialty or proprietary interfaces with custom protocols, may also be utilized to provide connections between any of the various components of IC 10.

Processor complex 26 may include any number of central processing units (CPUs) (not shown), a supporting cache hierarchy including a level two (L2) cache (not shown), and multiple other components and logic. The CPU(s) of processor complex 26 may include circuitry to execute instructions defined in an instruction set architecture. Specifically, one or more programs comprising the instructions may be executed by the CPU(s). Any instruction set architecture may be implemented in various embodiments. For example, in one embodiment, the ARM™ instruction set architecture (ISA) may be implemented. The ARM instruction set may include 16-bit (or Thumb) and 32-bit instructions. Other exemplary ISA's may include the PowerPC™ instruction set, the MIPS™ instruction set, the SPARC™ instruction set, the x86 instruction set (also referred to as IA-32), the IA-64 instruction set, etc.

In various embodiments, coherence point 18, switch fabric 20, bus mux 28, and I/O mux 40 may constitute a communication fabric (or fabric) for providing a top-level interconnect for IC 10. In various embodiments, different types of traffic may flow independently through the fabric. The independent flow may be accomplished by allowing a single physical fabric bus to include a number of overlaying virtual channels, or dedicated source and destination buffers, each carrying a different type of traffic. Each channel may be independently flow controlled with no dependence between transactions in different channels. In other embodiments, the fabric shown in FIG. 1 may include one or more other units, two or more units may be combined into a single unit, and/or one or more units may be omitted.

Coherence point 18 may be configured to act as a gateway between the coherent and non-coherent domains in IC 10. Coherence point 18 may be the location in IC 10 where memory operations become globally visible. Coherence point 18 may also include L2 duplicate tags (not shown), which are tags from the L2 cache(s) (in processor complex 26) for all coherent agents in IC 10 and which may be snooped by coherence point 18 for coherency operations. Coherence point 18 may also include additional logic (e.g., coherence control unit, memory interface unit, current transaction table, dependency logic unit) not shown in FIG. 1. For example, in various embodiments, coherence point 18 may include cache coherency logic employing a cache coherency protocol to ensure data accessed by each agent is kept up to date. An example of a cache coherency protocol includes the MOESI protocol with the Modified (M), Owned (O), Exclusive (E), Shared (S), and Invalid (I) states. Coherence point 18 may be coupled to switch fabric 20, and coherence point 18 may be coupled to other devices of IC 10 via switch fabric 20. Switch fabric 20 may be used to aggregate traffic from multiple devices within IC 10. In some embodiments, coherence point 18 and switch fabric 20 may be integrated within a single structure which may be referred to as a coherent switch.

Coherence point 18 may allow memory access requests from any requestor in IC 10 to snoop the cache hierarchy of processor complex 26. Thus, data produced by the CPUs of processor complex 26 may not be explicitly flushed for the data to be visible to the other devices and agents of IC 10. If the most recent copy of data is present in the cache hierarchy, then read requests may receive the most recent copy from the cache hierarchy. For write requests, merging may be performed for a cache line present in the cache hierarchy for any requestor in IC 10.

Bus mux 28 is coupled to memory via switch fabric 20, and bus mux 28 is also coupled to display controller 30, media controller 34, and camera 32. Bus mux 28 may also be referred to as an IC mux or SoC mux. In other embodiments, bus mux 28 may also be coupled to other devices (e.g., flash controller) not shown in FIG. 1. Bus mux 28 is also coupled to I/O mux 40, which is coupled to I/O interfaces 42 and 44.

I/O interfaces 42 and 44 are representative of any number of I/O interfaces or devices connected to I/O mux 40. I/O interfaces 42 and 44 may provide interfaces to any type of peripheral device implementing any hardware functionality included in the system. For example, I/O interfaces 42 and 44 may connect to audio peripherals such as microphones, speakers, interfaces to microphones and speakers, audio processors, digital signal processors, mixers, etc. Other I/O devices may include interface controllers for various interfaces external to IC 10, including interfaces such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a DAC, and so forth. Other I/O devices may also include networking peripherals such as media access controllers (MACs).

IC 10 may group processing blocks associated with non-real-time memory performance, such as the media controller 34, for image scaling, rotating, and color space conversion, accelerated video decoding for encoded movies, audio processing and so forth. Camera 32 and media controller 34 may include analog and digital encoders, decoders, and other signal processing blocks. In other embodiments, the IC 10 may include other types of processing blocks in addition to or in place of the blocks shown.

Memory controller 16 may include one or more memory caches (not shown). The memory caches may be used to reduce the demands on memory bandwidth and to reduce power consumption. The allocation policy for the memory caches may be programmable. Memory controller 16 may include any number of memory ports and may include circuitry configured to interface to memory. For example, memory controller 16 may be configured to interface to dynamic random access memory (DRAM) such as synchronous DRAM (SDRAM) (including mobile versions of the SDRAMs such as mDDR3, etc., and/or low power versions of the SDRAMs such as LPDDR2, etc.), RAMBUS DRAM (RDRAM), double data rate (DDR) SDRAM, DDR2 SDRAM, Rambus DRAM (RDRAM), static RAM (SRAM), GDDR4 (Graphics Double Data Rate, version 4) SDRAM, GDDR5 (Graphics Double Data Rate, version 5) SDRAM, etc. Memory controller 16 may also be coupled to memory physical interface circuits (PHYs) 12 and 14. Memory PHYs 12 and 14 are representative of any number of memory PHYs which may be coupled to memory controller 16. Memory PHYs 12 and 14 may be configured to interface to memory devices (not shown). Memory PHYs 12 and 14 may handle the low-level physical interface to the memory devices. For example, the memory PHYs 12 and 14 may be responsible for the timing of the signals, for proper clocking to synchronous DRAM memory, etc.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown. In addition, in other embodiments, the connections between components of IC 10 may differ from those shown in FIG. 1. For example, direct connections between components may be used for components that are not directly connected in FIG. 1, and components with direct connections in FIG. 1 may instead connect via one or more other components.

Figure 2:
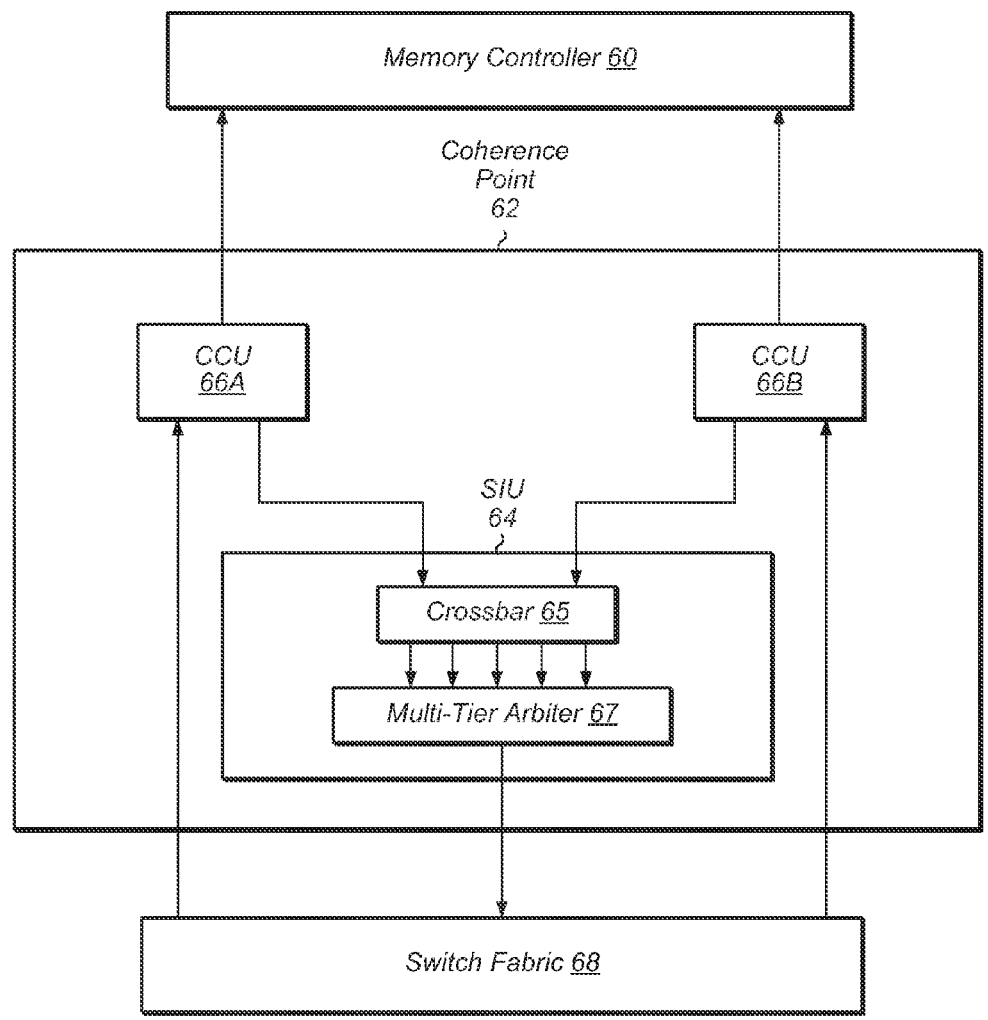
FIG. 2 is a block diagram that illustrates one embodiment of a coherence point coupled to a memory controller and a switch fabric.

Turning next to FIG. 2, a block diagram of one embodiment of a coherence point 62 coupled to memory controller 60 and switch fabric 68 is shown. Coherence point 62 may include two separate coherence control units (CCUs) 66A and 66B, which may be referred to as left and right channels, respectively. It is noted that in other embodiments, coherence point 62 may have other numbers of CCUs (e.g., 1, 4, 8). Coherence point 62 may also include switch interface unit (SIU) 64 for arbitrating among traffic being sent from CCUs 66A and 66B to switch fabric 68.

SIU 64 may include crossbar 65 and multi-tier arbiter 67. Crossbar 65 may be configured to route transactions to the appropriate individual arbiters in the first tier of multi-tier arbiter 67. Crossbar 65 may also be referred to as a router or an interconnect unit. In one embodiment, multi-tier arbiter 67 may utilize three levels of arbitration to select from transactions going from CCUs 66A-B to switch fabric 68. In other embodiments, multi-tier arbiter 67 may utilize other numbers of levels of arbitration. It is noted that coherence point 62 may also include other logic and units not shown in FIG. 2 to avoid obscuring the figure.

When a transaction is sent by switch fabric 68 to coherence point 62 and received by a given CCU 66, the CCU 66 may store the transaction in an available entry of a current transaction table (CTT) (not shown). The entry may remain in the CTT until all processing associated with the transaction has been completed within coherence point 62. The CTT may include any number of entries for storing attributes associated with outstanding transactions. It is noted that the term "transaction" may be used to refer to a "memory transaction", "input/output (I/O) transaction", or other type of transaction. It is also noted that the term "transaction" may refer to a "request" or a "response". It is further noted that the terms "transaction", "master", and "packet" may be used interchangeably throughout the disclosure.

Transactions that target memory may be sent from coherence point 62 to memory controller 60. Transactions that target agents or components in the non-memory address space may be sent in the downstream direction from coherence point 62 through SIU 64 to switch fabric 68. In one embodiment, there may be a single connection path between SIU 64 and switch fabric 68, while switch fabric 68 may have multiple connection paths to agents and components (not shown) in the rest of the SoC. In one embodiment, SIU 64 may be configured to manage credits for each of the multiple connection paths from switch fabric 68 to the other agents and components. By utilizing the multi-tiered arbiter 67, coherence point 62 may avoid starvation, ensure fairness, and maximize bandwidth utilization for downstream traffic going to switch fabric 68.

Figure 3:
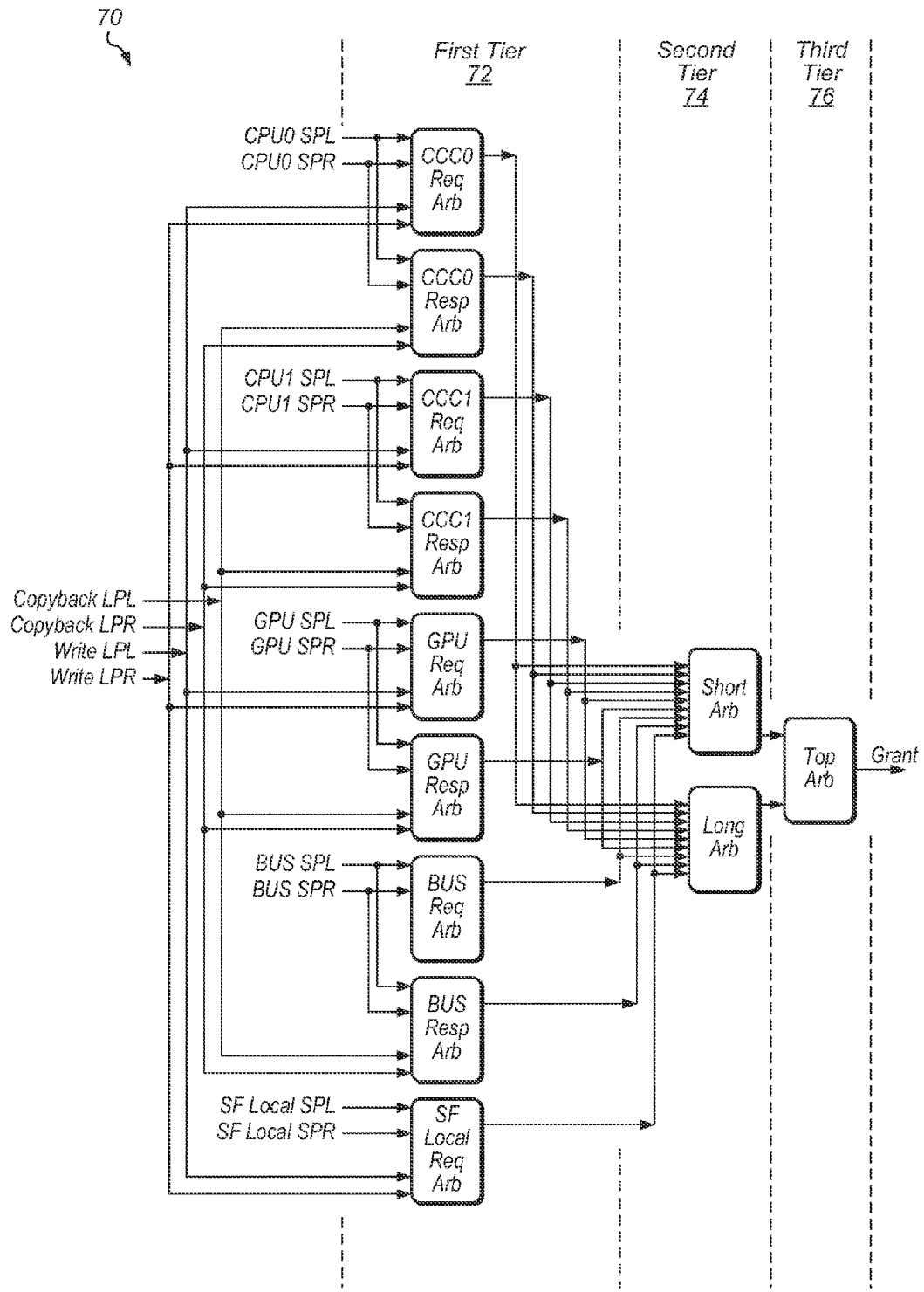
FIG. 3 is a block diagram of one embodiment of a multi-tier arbiter.

Referring now to FIG. 3, a block diagram illustrating one embodiment of a multi-tier arbiter is shown. In one embodiment, multi-tier arbiter 70 may include three tiers (or levels) of arbitration. The first tier 72 of arbitration may include multiple individual arbiters. Each individual arbiter may receive as inputs all of the transactions for a corresponding credit group and sub-channel combination. The credit group may include all of the transactions targeting a given downstream leg out of the switch fabric. Also, there may be a first sub-channel for all of the requests for a given downstream leg, and there may be a second sub-channel for all of the responses for a given downstream leg. Therefore, in one embodiment, there may be two arbiters in the first level of arbitration for each downstream leg connected to the switch fabric. However, for the local switch fabric traffic, there may only be a single arbiter for request traffic.

As shown in FIG. 3, multi-tier arbiter 70 has nine separate individual arbiters in first tier 72 for five separate credit groups. The five separate credit groups are CPU0 and CPU1, GPU, Bus mux, and switch fabric (SF) local. The SF local group may not have a response arbiter in the first tier 72 since the SF local traffic will only include request traffic. It is noted that in other embodiments, the first tier of a multi-tier arbiter may have other numbers of individual arbiters. The inputs to the multi-tier arbiter 70 may be routed using a crossbar (not shown) to connect to the appropriate arbiter in first tier 72. The inputs include short packet left (SPL) and short packet right (SPR) for each of the credit groups in the SoC. Left and right may refer to the separate CCUs (or channels) in the coherence point (not shown). There may also be copyback long packet left (LPL) and copyback long packet right (LPR) inputs to each of the arbiters of the first tier 72. Copyback packets refer to response data received from the coherent domain for read requests that hit in the L2 duplicate tags (not shown) of the coherence point. Additionally, there may be write LPL and write LPR inputs to each of the arbiters of the first tier 72. Write packets refer to requests for victim data corresponding to the victims of read requests in the coherent domain.

Only transactions with available credits on their respective downstream leg may be forwarded from the first tier 72 to the second tier 74. In one embodiment, the requests and responses that pass through SIU 70 may be categorized as either long packets or short packets. Long packets are packets with data and short packets are packets without data. The first arbiter of the second tier 74 may receive all of the short packets that were selected out of the first tier 72. The second arbiter of the second tier 74 may receive all of the long packets that were selected out of the first tier 72.

The packets selected from the arbiters of the second tier 74 may be forwarded to the final (or top) arbiter of the third tier 76. If the arbiter on the third tier 76 has a long packet and a short packet ready, then the arbiter may select the long packet since the short packet may be sent for free in the next cycle by overlapping the command of the short packet with the second data beat from the long packet. When a long packet that requires two beats of data wins the arbitration on the third tier 76, the long packet may be ignored by the arbiter in the third tier 76 on the next cycle. It is noted that in this case, only the long packet to the final arbiter is masked, while the long packet inputs to the first tier 72 arbiters are not masked. Otherwise this could result in starvation if short packets were to move ahead and use up all of the command credits.

In one embodiment, the final arbiter of the third tier 76 may optimize for scenarios where occasional short packets are mixed in with a steady stream of two-beat long packets. Whenever a short packet arrives at the final arbiter and there was no short packet input to the final arbiter on the previous cycle, the long packet may be given priority since the short packet is guaranteed to have a slot on the next cycle. The short packet may be guaranteed to have a slot on the next cycle by default if the long packet is a two-beat packet or by arbitration priority if the long packet is a one-beat packet. The number of beats of a packet may refer to the number of clock cycles required to the data associated with the packet.

Figure 4:
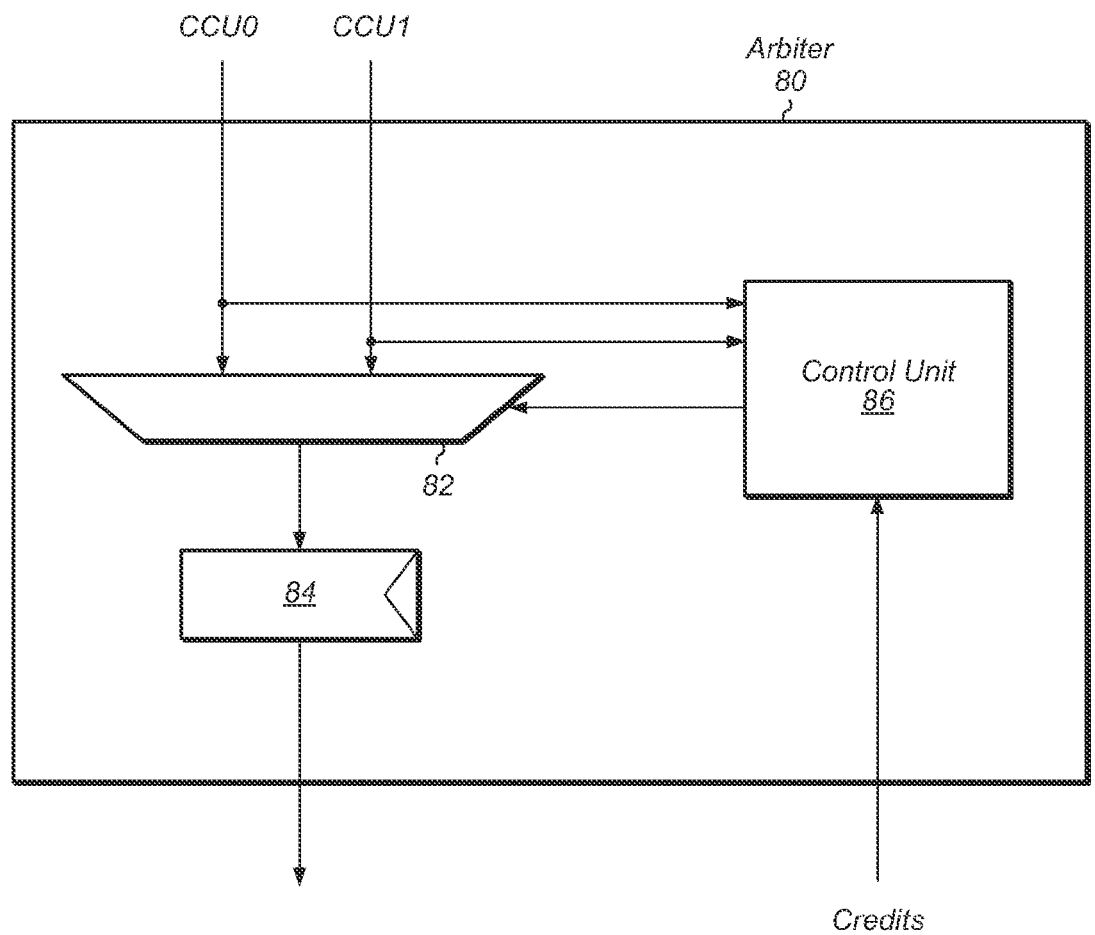
FIG. 4 illustrates one embodiment of an arbiter.

Referring now to FIG. 4, one embodiment of a credit level arbiter is shown. Credit level arbiter 80 may be configured to arbitrate among transactions sharing the same group of credits in the same sub-channel of a single downstream leg out of the switch fabric. For example, for a downstream leg coupled to a GPU, there may be a first credit level arbiter for responses targeting the GPU and there may be a second credit level arbiter for requests targeting the GPU. In one embodiment, credit level arbiter 80 may be located within a first tier of a multi-tier arbiter within a SIU, such as first tier 72 of multi-level arbiter 70 (of FIG. 3).

Credit level arbiter 80 may include multiplexer (mux) 82, register 84, and control unit 86. Mux 82 and control unit 86 may be configured to receive incoming transactions to arbiter 80. The two inputs shown from CCU0 and CCU1 may represent any number of transactions in a given clock cycle. In other embodiments, other numbers of inputs from other numbers of CCUs may be coupled to mux 82 and control unit 86. Control unit 86 may be configured to provide a selection control to mux 82. The output of mux 82 is coupled to register 84, which is further coupled to the next level of the multi-level arbiter (not shown). In one embodiment, the next level of the multi-level arbiter may include at least a pair of packet level arbiters. Although not shown in FIG. 4, in some embodiments, control unit 86 may send signals back to CCU0 and CCU1 (not shown) to instruct the CCUs to send or not send transactions forward based on the number of available credits and other arbitration-based information.

Control unit 86 may receive credit indications from the switch fabric for the transactions that are routed to arbiter 80. In one embodiment, there may be separate credits for data and commands, and a transaction may need a command credit and a number of data credits equal to the number of data beats of the transaction. If there are credits available for the received transactions, then control unit 86 may allow a selected transaction to be forwarded to the next level of the multi-level arbiter. If there are no credits available, then control unit 86 may block the received transactions and prevent these transactions from being forwarded to the next level. If there are insufficient credits for a transaction with data but sufficient command credits, then only command transactions may be forwarded out of arbiter 80.

If there are enough credits available on the targeted downstream leg of the switch fabric, control unit 86 may arbitrate among the received transactions and select a transaction to be transmitted to the next level of the SIU multi-level arbiter. Control unit 86 may generate the selection control to mux 82 to select the transaction and provide the selected transaction to register 84. Register 84 may drive the transaction onto the next level of the SIU multi-level arbiter. Register 84 may be provided to ensure that the transaction is driven onto the next level at the beginning of the clock cycle. In other embodiments, register 84 may be eliminated and the transaction may be coupled to the next level directly from mux 82.

After determining that the credit group has enough credits for any transaction to actually be able to be sent on the respective downstream leg of the switch fabric, control unit 86 may implement any arbitration scheme to select among the received transactions. For example, in one embodiment, control unit 86 may implement a strict priority selection with starvation prevention. In such a scheme, the highest priority transaction is normally selected as the winner of the arbitration. If more than one transaction has the highest priority, any mechanism may be used to select among the transactions (e.g. fixed priority among the transactions, round-robin among the transactions, etc.). Other embodiments may implement other arbitration schemes (e.g. round-robin without priority, weighted round-robin based on priority, combinations of round-robin and priority schemes, etc.). A round-robin scheme means that a transaction from each source is selected in turn for forwarding to the next level of the multi-level arbiter. If there is no transaction for a particular source, then a transaction from the next source is selected.

Figure 5:
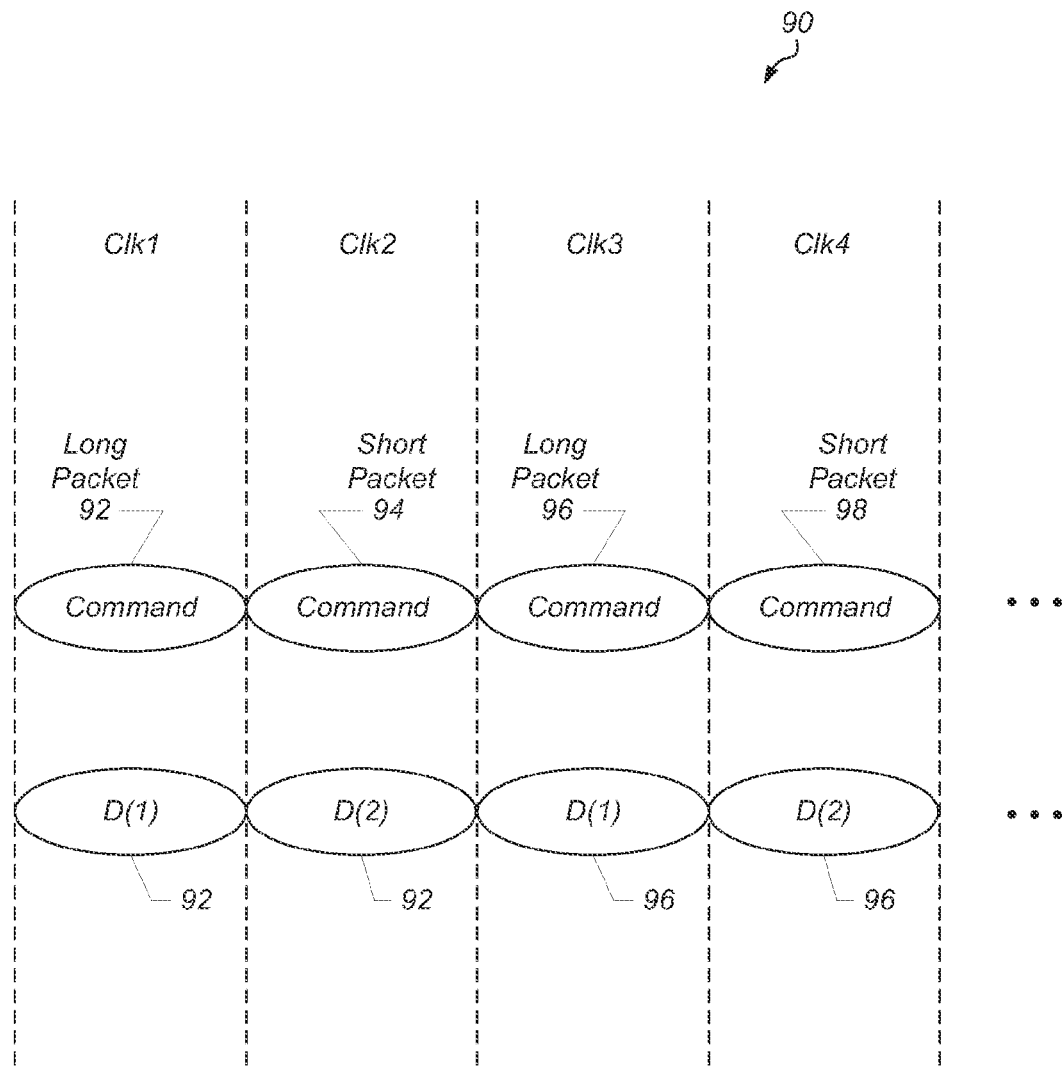
FIG. 5 illustrates a timing diagram of a connection path between a SIU and a switch fabric in accordance with one embodiment.

Turning now to FIG. 5, one embodiment of a timing diagram of the transmission of packets on a bus between a SIU and a switch fabric is shown. Timing diagram 90 illustrates the timing of packets sent from the last tier of the multi-tier arbiter of the SIU to the switch fabric. The final arbiter of the multi-level arbiter in the SIU may be configured to alternate long and short packets, as shown in timing diagram 90. This may maximize the use of the available bandwidth on the connection path between the SIU and the switch fabric.

In one embodiment, the connection path between the SIU and the switch fabric may have separate wires for the command and data, such that command and data may be sent in the same clock cycle. Therefore, the final arbiter of the multi-level arbiter in the SIU may attempt to overlap the command of a short transaction with the last data beat of the previous long transaction to maximize bandwidth utilization on the connection path. As shown in timing diagram 90, long packet 92 may include a command and two data beats, D(1) and D(2). The command and first data beat of long packet 92 may be sent in the first clock cycle (Clk1), and then the second data beat of long packet 92 may be sent simultaneously with the command of short packet 94 in the next clock cycle (Clk2). Similarly, long packet 96 may be sent in Clk3, and then the command of short packet 98 may overlap with the second data beat of long packet 96 in the subsequent clock cycle (Clk4). This pattern may continue for any number of clock cycles, as long as the proper inputs are available at the final arbiter in the appropriate clock cycle.

Figure 6:
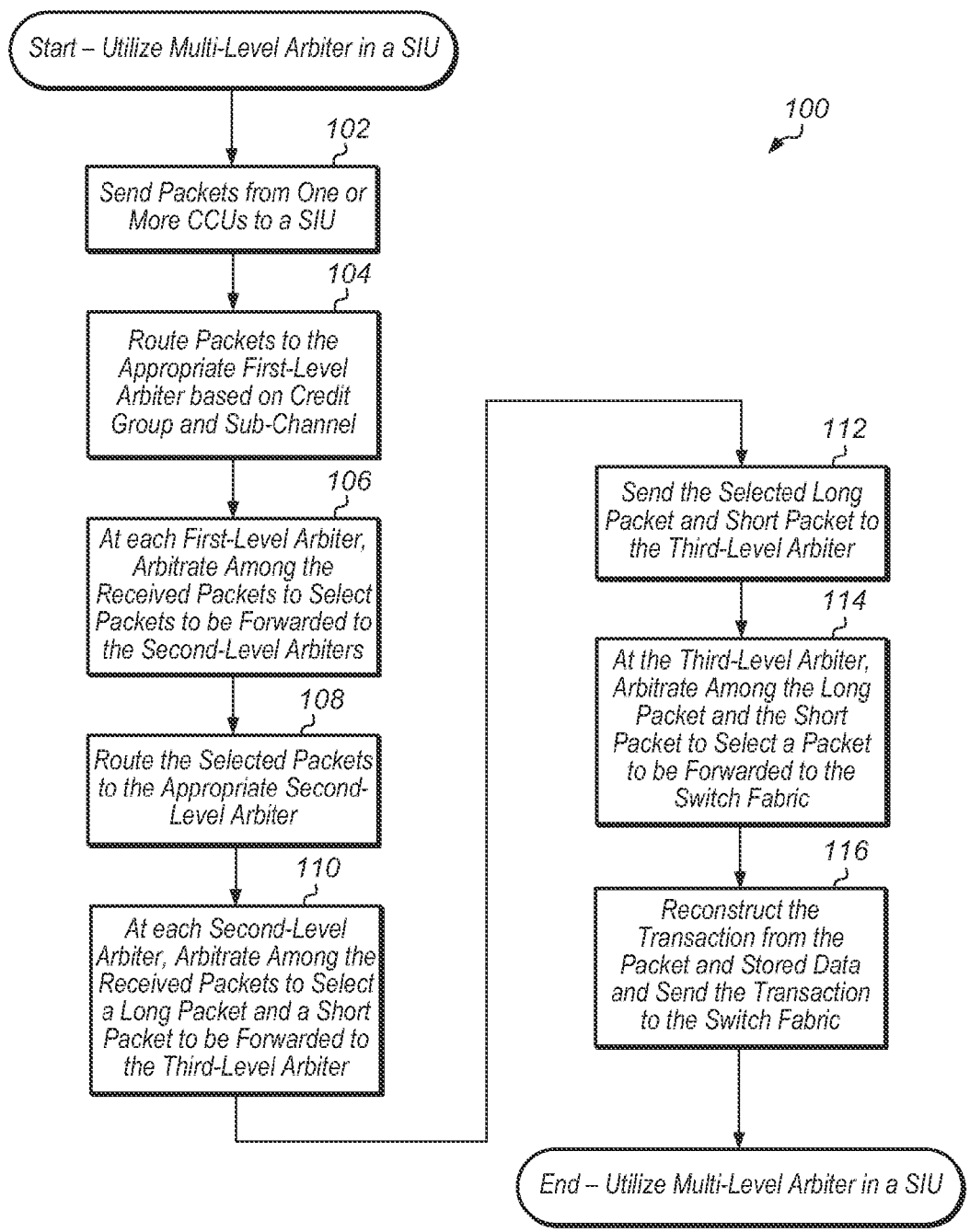
FIG. 6 is a generalized flow diagram illustrating one embodiment of a method for utilizing a multi-level arbiter in a SIU.

Referring now to FIG. 6, one embodiment of a method 100 for utilizing a multi-level arbiter in a SIU is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

Packets may be sent from one or more CCUs to the SIU (block 102). In one embodiment, the coherence point may include two CCUs, and each of the two CCUs may send packets that target any of the downstream legs out of the switch fabric to the SIU. In other embodiments, the coherence point may include other numbers of CCUs. Next, the packets may be routed to the appropriate first-level arbiter based on the credit group and sub-channel of the packets (block 104). In one embodiment, each credit group may have a pair of first-level arbiters. A first first-level arbiter may receive responses of a given credit group, and a second first-level arbiter may receive requests of the given credit group. In one embodiment, the SoC may have five separate credit groups including the GPU, two CPUs, a bus mux, and switch fabric local credit groups. In other embodiments, the SoC may include other numbers of credit groups corresponding to other numbers of devices.

Each of the first-level arbiters may arbitrate among the received packets to select a packet to be forwarded to the second-level arbiters (block 106). The first-level arbiters may only forward packets to the second-level arbiters if the packets have available credits. The selected packets out of the first-level arbiters may be routed to the appropriate second-level arbiters (block 108). In one embodiment, long packets may be routed to a first second-level arbiter and short packets may be routed to a second second-level arbiter.

Next, the second-level arbiters may arbitrate among the received packets and select a long packet and a short packet to be forwarded to a third-level arbiter (block 110). The selected long packet and the selected short packet may then be sent to the third-level arbiter (block 112). Then, the third-level arbiter may arbitrate between the long and short packet to select a packet to be forwarded to the switch fabric (block 114). The third-level arbiter may be configured to alternate between long and short packets, such that a short packet may overlap with the second data beat of a long packet. Next, the SIU may reconstruct the transaction from the packet and other information stored in the current transaction table (CTT) of the corresponding CCU and send the transaction to the switch fabric (block 116). After block 116, method 100 may end.

Figure 7:
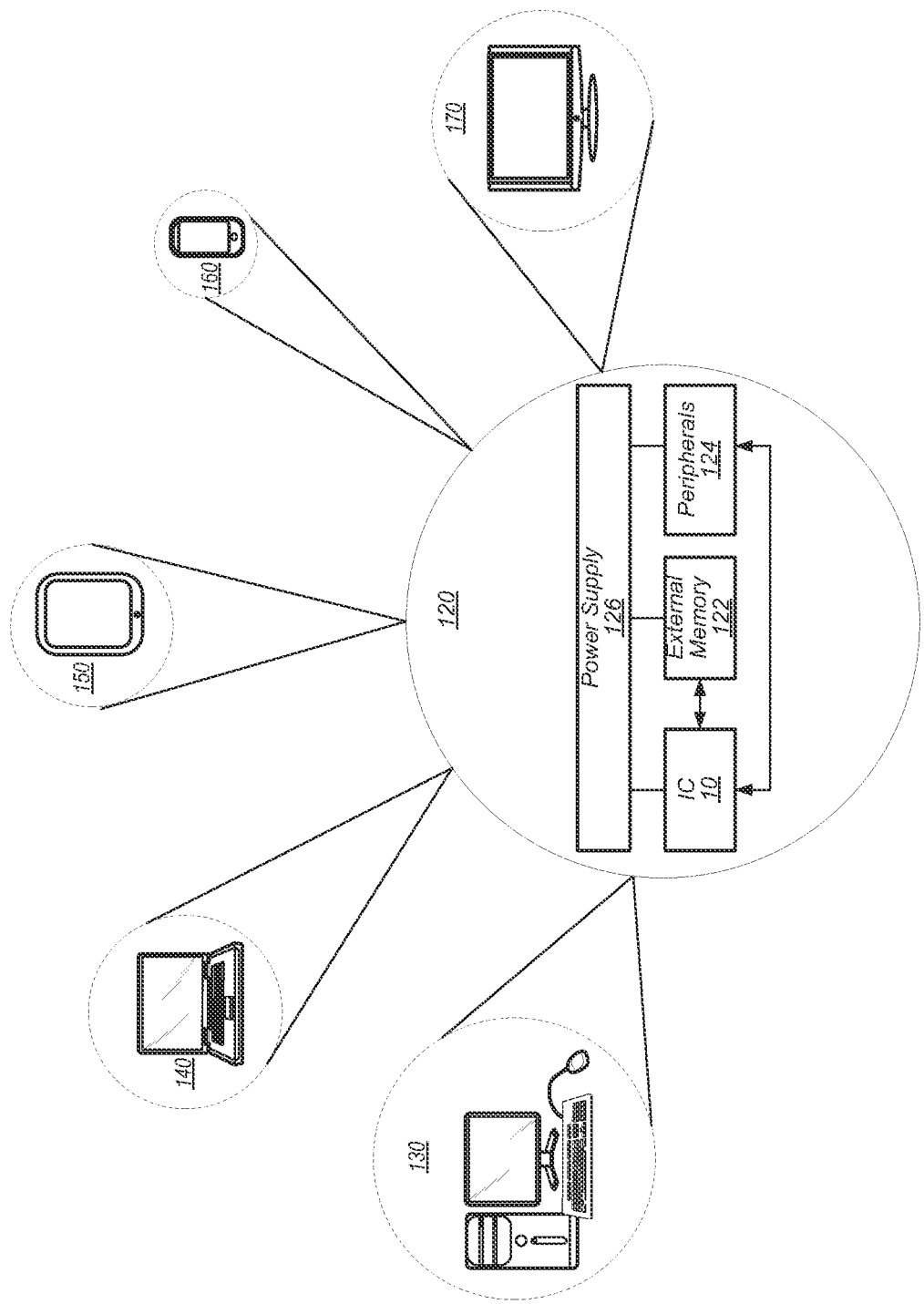
FIG. 7 is a block diagram of one embodiment of a system.

Turning now to FIG. 7, a block diagram of one embodiment of a system 120 is shown. As shown, system 120 may represent chip, circuitry, components, etc., of a desktop computer 130, laptop computer 140, tablet computer 150, cell phone 160, television 170 (or set top box configured to be coupled to a television), or otherwise. In the illustrated embodiment, the system 120 includes at least one instance of IC 10 (of FIG. 1) coupled to an external memory 122.

IC 10 is coupled to one or more peripherals 124 and the external memory 122. A power supply 126 is also provided which supplies the supply voltages to IC 10 as well as one or more supply voltages to the memory 122 and/or the peripherals 124. In various embodiments, power supply 126 may represent a battery (e.g., a rechargeable battery in a smart phone, laptop or tablet computer). In some embodiments, more than one instance of IC 10 may be included (and more than one external memory 122 may be included as well).

The memory 122 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 10 in a chip-on-chip configuration, a package-on-package configuration, or a multi-chip module configuration.

The peripherals 124 may include any desired circuitry, depending on the type of system 120. For example, in one embodiment, peripherals 124 may include devices for various types of wireless communication, such as wifi, Bluetooth, cellular, global positioning system, etc. The peripherals 124 may also include additional storage, including RAM storage, solid state storage, or disk storage. The peripherals 124 may include user interface devices such as a display screen, including touch display screens or multitouch display screens, keyboard or other input devices, microphones, speakers, etc.

Figure 8:
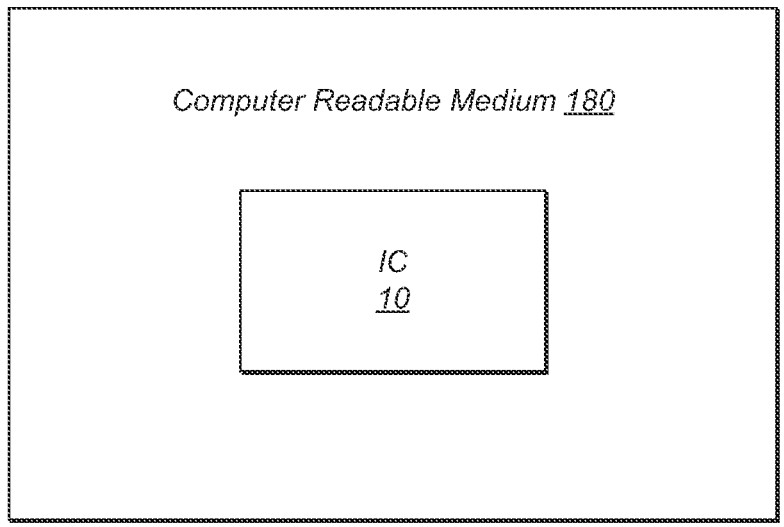
FIG. 8 is a block diagram of one embodiment of a computer readable medium.

Referring now to FIG. 8, one embodiment of a block diagram of a computer readable medium 180 including one or more data structures representative of the circuitry included in IC 10 (of FIG. 1) is shown. Generally speaking, computer readable medium 180 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 180 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 180 may be the netlist(s) (with or without the synthesis library) or the data set(s), as desired. In yet another alternative, the data structures may comprise the output of a schematic program, or netlist(s) or data set(s) derived therefrom. While computer readable medium 180 includes a representation of IC 10, other embodiments may include a representation of any portion or combination of portions of IC 10 (e.g., coherence point 18). In other embodiments, the computer readable medium 180 may have program instructions stored therein which are executable by a processor to perform the methods described herein.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A coherence point comprising a switch interface unit (SIU), wherein the SIU is configured to:
    receive a plurality of packets from one or more coherence control units (CCUs);
    arbitrate among the plurality of packets using a plurality of first-level arbiters to select a first group of packets for forwarding to a pair of second-level arbiters, wherein only packets eligible to be sent out of a switch fabric on downstream channels are forwarded to the pair of second-level arbiters;
    arbitrate among the first group of packets using the pair of second-level arbiters to select a second group of packets for forwarding to a third-level arbiter; and
    arbitrate among the second group of packets using the third-level arbiter to select a final packet for forwarding to the switch fabric.

2. The coherence point as recited in claim 1, wherein each arbiter of the plurality of first-level arbiters is configured to arbitrate among packets sharing credits and sharing a same sub-channel.

3. The coherence point as recited in claim 2, wherein request packets are assigned to a first sub-channel, and wherein response packets are assigned to a second sub-channel.

4. The coherence point as recited in claim 3, wherein the first-level arbiters include a pair of arbiters for each downstream channel out of the switch fabric.

5. The coherence point as recited in claim 4, wherein the first-level arbiters are configured to determine if packets are eligible to be sent out of the switch fabric on downstream channels based on an availability of credits for each downstream channel.

6. The coherence point as recited in claim 5, wherein a first second-level arbiter is configured to arbitrate among long packets, and wherein a second second-level arbiter is configured to arbitrate among short packets.

7. The coherence point as recited in claim 5, wherein the second group of packets comprises a long packet and a short packet.

8. The coherence point as recited in claim 7, wherein there is a single connection path between the SIU and the switch fabric for forwarding packets.

9. The coherence point as recited in claim 8, wherein the plurality of packets received from the one or more CCUs target non-memory address space.

10. The coherence point as recited in claim 9, wherein the third-level arbiter is configured to alternate between selecting long and short packets, and wherein a short packet overlaps with a last data beat of a long packet.

11. A method comprising:
    sending packets from one or more coherence control units to a switch interface unit (SIU);
    arbitrating among packets at a credit group level to select packets with available credits, wherein one or more credits are needed for forwarding a packet from a switch fabric on a given downstream channel;
    routing selected packets to corresponding packet-type arbiters;
    arbitrating among long packets at a first packet-type arbiter to select a long packet for forwarding to a final arbiter;
    arbitrating among short packets at a second packet-type arbiter to select a short packet for forwarding to the final arbiter; and
    arbitrating among the selected short packet and the selected long packet at the final arbiter to select a packet for forwarding to the switch fabric.

12. The method as recited in claim 11, wherein the SIU is configured to receive credit indications from the switch fabric based on a number of available credits per downstream channel.

13. The method as recited in claim 12, wherein the packet is forwarded on a single connection path from the SIU to the switch fabric.

14. The method as recited in claim 13, further comprising overlapping a short packet with a last data beat of a long packet.

15. The method as recited in claim 14, wherein each downstream channel is connected to a corresponding device.

16. The method as recited in claim 15, wherein the first and second packet-type arbiters are configured to select among packets in a round-robin manner.

17. A method comprising:
    routing packets to a first level of arbiters based on a credit group and a sub-channel of the packets;
    arbitrating among the packets at the first level of arbiters to select packets to be forwarded to a second level of arbiters;

arbitrating among the selected packets at the second level of arbiters to select a long packet and a short packet to be forwarded to a third level arbiter; and arbitrating among the selected long packet and the selected short packet at the third level arbiter to select a packet to be forwarded to a switch fabric, wherein the third level arbiter is configured to alternate between long and short packets.

18. The method as recited in claim 17, wherein only packets with available credits are forwarded to the second level of arbiters.

19. The method as recited in claim 18, wherein the first level of arbiters comprises a separate arbiter for each unique credit group and sub-channel combination.

20. The method as recited in claim 19, wherein for one or more credit groups, a first sub-channel is reserved for requests and a second sub-channel is reserved for responses.

21. The method as recited in claim 20, wherein credits are needed for sending packets from the switch fabric on a downstream channel.

22. An apparatus comprising:
one or more coherence control units (CCUs);
a switch interface unit (SIU) coupled to the one or more CCUs; and
a switch fabric coupled to the SIU and the one or more CCUs;
wherein the SIU is configured to:
receive a plurality of packets from the one or more CCUs;
arbitrate among the plurality of packets at a first level of arbiters to select packets to be forwarded to a second level of arbiters, wherein the first level of arbiters selects packets that are eligible to be sent out of the switch fabric on one or more downstream channels;
arbitrate among the selected packets at the second level of arbiters, wherein the second level of arbiters are configured to select a long packet and a short packet to be forwarded to a third level arbiter; and
arbitrate among the selected long packet and the selected short packet at the third level arbiter to select a final packet to be forwarded to the switch fabric.

23. The apparatus as recited in claim 22, wherein the SIU is configured to:
reconstruct a transaction corresponding to the final packet; and
send the transaction to the switch fabric.

24. The apparatus as recited in claim 23, wherein the third level arbiter is configured to alternate between selecting short packets and long packets.

25. The apparatus as recited in claim 24, wherein the second level of arbiters comprises a first arbiter for arbitrating among long packets and a second arbiter for arbitrating among short packets.

26. The apparatus as recited in claim 25, wherein long packets selected by the first level of arbiters are routed to the first arbiter, and wherein short packets selected by the first level of arbiters are routed to the second arbiter.

* * * * *